(No Model.) 2 Sheets—Sheet 1.
J. W. TAYLOR.
MACHINE FOR CUTTING METAL BLANKS INTO CUTTERS.
No. 510,207. Patented Dec. 5, 1893.
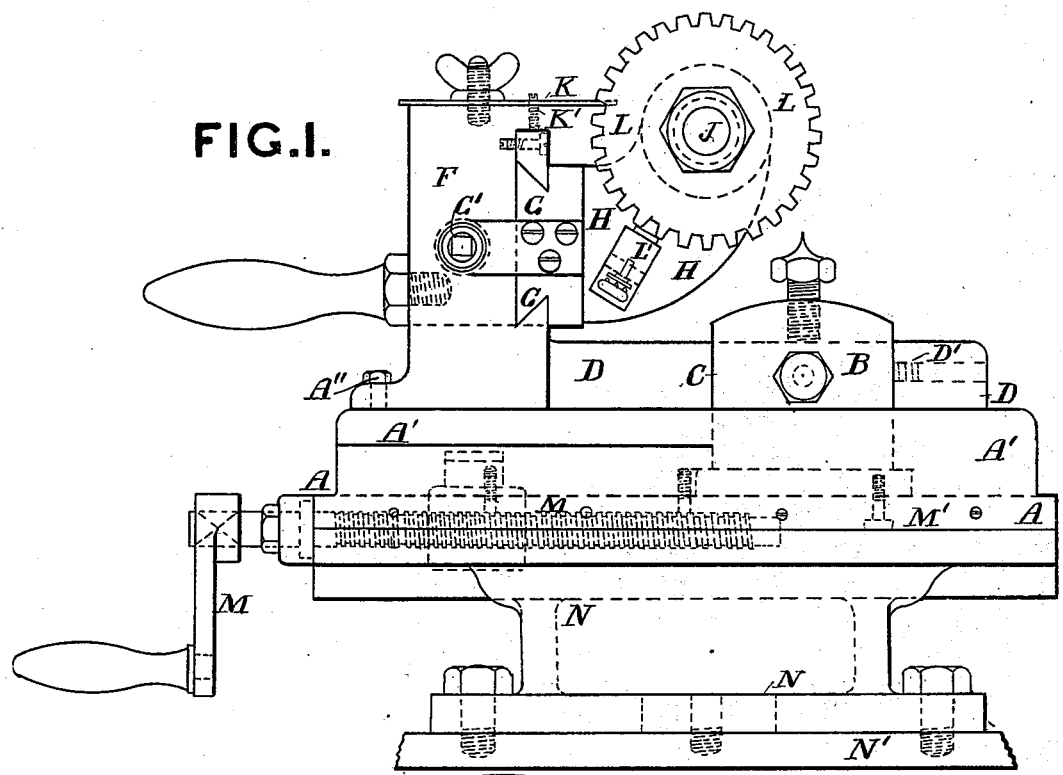
FIG. I.
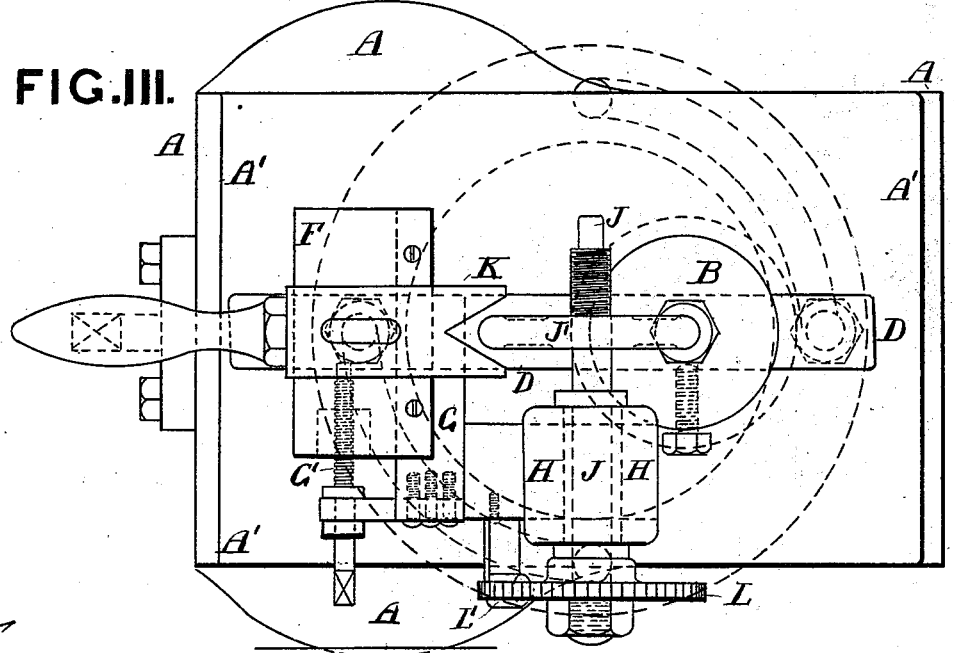
FIG. III.
Witnesses
Thomas Kendrick
Alfred Leonard Kendrick
Inventor
John William Taylor (No Model.) 2 Sheets—Sheet 2.
J. W. TAYLOR.
MACHINE FOR CUTTING METAL BLANKS INTO CUTTERS.
No. 510,207. Patented Dec. 5, 1893.
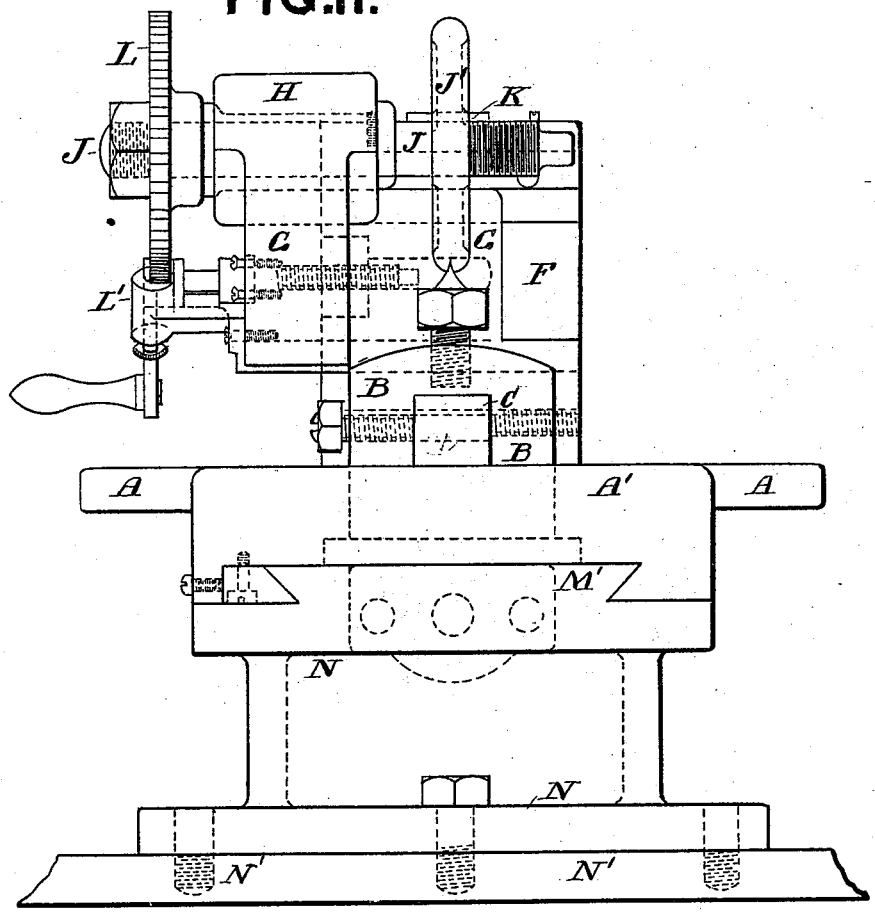
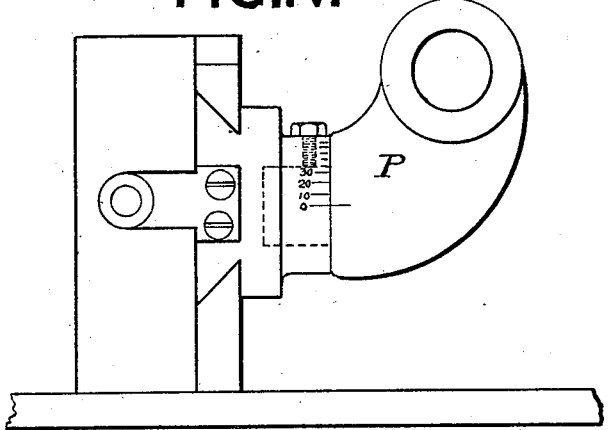

UNITED STATES PATENT OFFICE.

JOHN WILLIAM TAYLOR, OF BIRMINGHAM, ENGLAND.

MACHINE FOR CUTTING METAL BLANKS INTO CUTTERS.

SPECIFICATION forming part of Letters Patent No. 510,207, dated December 5, 1893.

Application filed March 15, 1893. Serial No. 466,148. (No model.) Patented in England March 12, 1891, No. 4,418.

*To all whom it may concern:*

Be it known that I, JOHN WILLIAM TAYLOR, engineer, a citizen of England, and a subject of Her Britannic Majesty, residing at 85 Sycamore Road, Aston, Birmingham, in the county of Warwick, England, have invented new and useful improvements in and relating to machinery for cutting metal blanks into cutters and for grinding the same, which improvements may be applied to milling or drilling machines and other machines, and are also applicable for cutting gear-wheels and bevel-wheels and for fluting taps and such like, (for which I have obtained British Letters Patent No. 4,418, bearing date March 12, 1891;) and I do hereby declare the following to be a full, clear, and exact description of the invention, aided by the accompanying sheets of drawings.

In the accompanying sheets of drawings, Figure I is a side elevation of the improved machine; Fig. II a front elevation; Fig. III a plan of the machine; Fig. IV a side elevation of the additional back center bracket.

My machine consists of a horizontal cast iron table (A) and main slide (A'.). Upon the table is a vertical pivot (B.) capable of turning on its vertical axis in the slide A' and having in it a horizontal slot (C.) through which there passes a bar (D.), this bar moving on the surface of the table from the pivot as a center and with a radius which can be varied by adjusting the position of the bar (D.) in the pivot. At one end of the bar D is an enlarged part (F.) into which is fitted a horizontal slide (G.) capable of moving (by suitable screw G'.) at right angles to the bar and carrying a bracket (H.). This bracket has a hole bored at right angles to the bar to receive the mandrels (J.) on which the blanks (J'.) to be operated upon are placed, the plane of the blank thus lying in the direction of the axis of the bar. By means of the slide (G.) at the head of the bar the blank (J'.) may be placed directly over the bar (D.) or at any distance within limits on either side of it. To secure the first position a V. shaped gage (K.) Fig. III. is made to move in a slide (K'.), Fig. I., cut in the top of the enlarged part (F.) of the bar (D.) and directly over the center of it (the bar), so that when both sides of the V. touch the blank it is also central with the bar. To regulate the radius through which the mandrel (J.) swings, there is marked on the side of the bar (D.) a scale (D'.) which reads zero when the center of the mandrel (J.) is directly over the center of the pivot (B.).

The blank (J'.) is spaced to enable the desired number of teeth to be cut in it by means of a dividing plate (L) placed on the mandrel (J.), and a catch (L') fixed to the mandrel bracket (H.) and engaging with the notches in the rim of the dividing plate (L.).

The table (A.) main slide (A') together with the pivot (B.) arm or bar (D.), &c., can be moved bodily in a horizontal direction by a suitable handle and screw (M.) in a slide (M'.) cut on the top of a short pedestal (N.). The bottom of this pedestal (N.) fits into a base plate (N'.), but is capable of being rotated into and fixed at any angle up to ninety degrees; the base plate (N'.) being clamped to the table of any drilling or vertical milling machine.

Supposing it be required to make a radius cutter having a cutting-edge of one-half inch radius and an outside diameter of five inches; the blank is fixed on the mandrel (J.) and adjusted as described by the V shaped gage (K) until the center of the cutter coincides with the axis of the bar; the scale (D'.) on the side of the bar (D) being placed at two inches the center of the radius to be cut is brought directly over the center of the pivot (B.) and the tooth can be cut to any required depth by rotating the bar round the pivot.

In order to tooth a cutter of rectangular section the bar (D.) is placed in a line with the slide (A'.) and is made secure by the screw or bolt (A".) which passes through the end of the bar (D.). The pins that screw the machine to the base plate (N'.) are then slackened so that the machine may be fixed to the required angle. Then, by actuating the slide (G.), the blank is operated upon by the cutter and the required taper tooth given to the wheel being produced from the blank.

What I claim is—

The combination, with a mandrel for holding the blank to be cut, of the horizontal slide G provided with a bracket H for supporting the mandrel, the horizontal bar D arranged at a right angle to the slide G and provided with the part F for supporting the said slide, the screw G' for moving the said slide crosswise of the part F, the slide A' under the bar D, the pivot B journaled in the said slide and provided with a slot C for the bar D to slide in, and the table A for supporting the said slide A' and the pivot, substantially as set forth.

In testimony whereof I affix my signature in the presence of two subscribing witnesses.

JOHN WILLIAM TAYLOR. [L. S.]

Witnesses:
   THOMAS KENDRICK,
   ALFRED LEONARD KENDRICK.